United States Patent [19]

Szipócs et al.

[11] Patent Number: 5,734,503
[45] Date of Patent: Mar. 31, 1998

[54] DISPERSIVE DIELECTRIC MIRROR

[76] Inventors: Róbert Szipócs, 2040 Budaörs., Patkó utca 7; Ferenc Krausz, 8066 Pusztavám, Kossuth utca 52, both of Hungary

[21] Appl. No.: 289,086

[22] Filed: Aug. 11, 1994

[30] Foreign Application Priority Data

Aug. 23, 1993 [HU] Hungary ............... P 9302398

[51] Int. Cl.$^6$ ........................... G02B 1/10
[52] U.S. Cl. ............ 359/584; 359/580; 359/900; 372/25; 372/99
[58] Field of Search ............. 359/584, 588, 359/580, 900; 372/25, 99

[56] References Cited

U.S. PATENT DOCUMENTS 3,943,457  3/1976  Lehmberg ............... 359/333

FOREIGN PATENT DOCUMENTS 902191  5/1953  Germany ............... 359/588
2-23302  1/1990  Japan ............... G02B 5/08

OTHER PUBLICATIONS

P. Laporta, et al., "Dispersive Effects in the Reflection of Femtosecond Optical Pulses from Broadband Dielectric Mirrors," *Applied Optics*, vol. 24, No. 13, pp. 2014–2020, 1 Jul. 1985.

M. Yamashita, et al., "Femtosecond-pulse Laser Compensated by Cavity-Mirror Dispersion", *Optics Letters*, vol. 11, No. 8, Aug. 1986, pp. 504–506.

A.M. Weiner, et al., "Femtosecond Time-Resolved Reflectometry Measurements of Multiple-Layer Dielectric Mirrors", *Optics Letters*, vol. 10, No. 2, Feb. 1985, pp. 71–73.

J. Kuhl, et al. "Compression of Femtosecond Optical Pulses with Dielectric Multilayer Interferometers", *IEEE Trans. Quantum Elec.*, V.QE–22, #1, Jan. 1986, pp. 182–185.

D.N. Christodoulides, et al., "Reflection of Femtosecond Optical Pulses from Multiple-Layer Dielectric Mirrors—Analysis", *IEEE Trans. Quantum Elec.*, V, QE–22, #1, Jan. 1986, pp. 186–191.

H. Kogelnik, "Coupled-Wave Theory of Distributed Feedback Lasers", *J. Appl. Phys.*, vol. 43, No. 5, May 1972, pp. 2327–2335.

J. Kuhl, et al., "Bandwidth-Limited Picosecond Pulse Generation in an Actively Mode-Locked GaAs laser with Intracavity Chirp Compensation, " *Optics Letters*, vol. 12, No. 5, May 1987, pp. 334–336.

M.S. Styx, et al., "Pulse Shaping in Passively Mode-Locked Ring Dye Lasers", IEEE J. Quantum Elect., vol. QE–19, No. 4, Apr. 1983, pp. 520–525.

(List continued on next page.)

Primary Examiner—Paul M. Dzierzynski
Assistant Examiner—John Juba, Jr.
Attorney, Agent, or Firm—Ladas & Parry

[57] ABSTRACT

Dispersive dielectric mirror exhibiting a monotonic, more particularly nearly linear group delay versus frequency function over a wide frequency range within the high reflectivity band of the mirror, which group delay is introduced on electromagnetic wavepackets, more particularly, on light pulses, when the electromagnetic wave is reflected on the mirror. The dispersive dielectric mirror can be well applied for dispersion control in electromagnetic impulse technique from microwave frequencies to X-rays, more particularly, in ultrashort-pulse-laser technique and its applications. One of the concrete applications of the dispersive dielectric mirrors is to solid-state-laser intracavity dispersion control of femtosecond pulse solid-state-laser oscillators instead of using of prism pairs. The laser built in this way is more compact, reliable and user friendly than its prism-pair-dispersion controlled predecessors.

11 Claims, 3 Drawing Sheets

OTHER PUBLICATIONS

J.A. Valdmanis, et al., "Design Considerations for a Femtosecond Pulse Laser Balancing Self Phase Modulation, Group Velocity Dispersion, Saturable Absorption, and Saturable Gain" *IEEE J. Quantum Elec.*, vol. QE–22, No. 1, pp. 112–118, Jan. 1986.

E. Spiller, "Broadening of Short Light Pulses by Many Reflections from Multilayer Dielectric Coatings", *Applied Optics*, vol. 10, #3, Mar. 1971.

Fork, R.L. et al. "Femtosecond Optical Pulses", IEEE Journal of Quantum Electronics, vol. QE–19, No. 4, Apr. 1983, pp. 500–506.

Fork, R.L. et al. "Negative Dispersion Using Pairs of Prisms", Optics Letters vol. 9, No. 51 May 1984, pp. 150–152.

Krausz, F., et al. "Femtosecond Solid State Lasers", IEEE Journal of Quantum Electronics, vol. 28, No. 10, Oct. 1992 pp. 2097–2122.

Ferenz, K. et al. "Recent Developments of Laser Optical Coatings in Hungary", Optical Engineering/Oct. 1993/vol. 32. No. 10/pp. 2525–2537.

De Silvestri, S. et al. "Analysis of Quarter–Wave Dielectric–mirror Dispersion in Femtosecond Dye–laser Cavities", Optics Letters, Aug. 1984, vol. 9, No. 8 pp. 335–337.

Weiner, A.M., et al. "Femtosecond Time–Resolved . . . " Optics Letters, Feb. 1985, vol. 10, No. 2, pp. 71–73.

Heppner, J. et al. "Intracavity chirp compensation . . . " Appl. Phys. Lett. 47(5), 1 Sep. 85, pp. 453–455.

Yamashita, M. et al. "A Chirp–Compensation Technique . . . " IEEE Journal of Quantum Electronics, vol. QE 23, No. 11, Nov. 1987, pp. 2005–2007.

Szipocs, R. et al. "Design of Dielectric . . . " SPIE vol. 2253, pp. 140–149, Jun. 1994.

Dubrowski, J.A. "Refinement of Optical . . . " Applied Optics, vol. 29, No. 19/Jul. 1, 1990, pp. 2876–2893.

Szipocs, R. et al. "Chirped Multilayer coatings . . . " Optics Letters, 19, No. 3, 201 (1994) pp. 201–203 No Month.

Stingl, A. et al. "Generation of 11–Fs pulses . . . " Optics Letters, 19, No. 3 204 (1994) pp. 204–206 No Month.

Babic, D.I. "Analytic Expressions . . . " IEEE Journal of Quantum Electronics, vol. 28, 2, Feb. 1992 pp. 514–524.

Stingl, A., "Sub–10–Fs Mirror–Dispersion . . . " Optics Letters, 20(6) 1995, pp. 602–604 No Month.

Szipocs, R. et al., "Pushing the Limits . . . " Optics & Photonics News, vol. 6, No. 6, pp. 16–59 (1995) No Month.

Spielmann, C. et al. "Compact, High–Throughput . . . " Opt. Commun. 120, pps. 321–324 (1995 Nov. 1).

Spielmann, C. et al. "Chirped Dielectric . . . " Laser Focus World, pp. 55–60, Dec. 1995.

DISPERSIVE DIELECTRIC MIRROR

FIELD OF THE INVENTION

The invention relates to high reflectivity dielectric structures, i.e. dielectric mirrors, more particularly to optical interference coatings used for dispersion control in electromagnetic impulse technique, especially in lasers or optical systems generating, amplifying or transmitting ultrashort optical pulses.

TECHNICAL BACKGROUND

One of the main trends of laser physics today is the research and development of femtosecond laser sources. The appearance of transition-metal-doped crystals having extremely broad fluorescence bands has brought great advances in this field allowing the construction of laser oscillators generating optical pulses of 10–100 fs directly at the laser output. In the nineties, application of these femtosecond solid state lasers in the fields of physics, chemistry, biology, medicine and technology has made it possible to investigate temporal processes that could not be observed before due to the lack of measuring apparatus with high enough temporal resolution. Additionally, these femtosecond-pulse lasers are planned for use in ultra-high-speed optical data transmission and processing systems. By utilizing laser amplifier systems, the intensity of a single laser pulse can be boosted to the terawatt power range, which is widely used in plasma physics. In the long term, coherent X-ray sources (X-ray lasers) and new particle accelerators, that are smaller and cheaper than those used today, are planned to be built using these laser amplifier systems. The relevance of intracavity dispersion control to passively mode-locked ultrashort-pulse lasers was recognized soon after the appearance of the first systems operating in the femtosecond domain (see R. L. Fork, C. V. Shank, R. Yen, C. A. Hirlimann, IEEE Journal of Quantum Electronics Vol. 19, p. 500, 1983). Negative dispersion due to wavelength-dependent refraction in a pair of Brewster-angled prisms combined with positive material dispersion proved an efficient and convenient means of controlling the net group-delay dispersion (GDD) inside the laser cavity (see. R. L. Fork, O. E. Martinez, and J. P. Gordon, Optics Letters Vol. 9, p. 150, 1984). In solid-state lasers femtosecond pulse generation always relies on a net negative, i.e. anomalous intracavity GDD owing to an ultrafast self-phase modulation (SPM) caused by the optical Kerr effect in the laser medium, which is often referred as solitary pulse formation in the literature. Hence, prism pairs became standard components of these systems. In practical prism-pair controlled broadband systems the major limitation to ultrashort pulse generation originates from the variation of the intracavity GDD with wavelength. The principal source of this high-order dispersion, however, has been found to be the prism pair (see F. Krausz et.al. IEEE Journal of Quantum Electronics Vol. 28, p. 2097, 1992).

Most of the lasers contain dielectric mirrors as important functional elements such as high reflectivity mirrors, output mirrors and dichroic mirrors, as described, for example, in the article of K. Ferencz and R. Szipöcs on page 2525, Optical Engineering Vol. 32, 1993. These dielectric mirrors consist of a number of transparent dielectric layers, which are deposited on a substrate. Deposition can be carried out by several different but well-known techniques. Their operation is based on the interference phenomenon of electromagnetic waves. However, these dielectric mirrors have not been used for introduction of a frequency dependent group delay on reflection over a wide frequency range, i.e., for broadband dispersion control so far.

Shortly after the emergence of femtosecond pulse dye lasers, the frequency-dependent phase retardation (phase dispersion) of multilayer dielectric mirrors built in laser cavities has been investigated both theoretically (see, S. De Silvestri et. al, Optics Letters, Vol. 9, p. 335, 1984) and experimentally (see, A. M. Weiner et. al., Optics Letters, Vol. 10, p. 71, 1985). Whereas standard quarter-wave dielectric mirrors were shown to introduce negligible dispersion at the center of their reflectivity bands, various specific high reflectivity coatings (Gires-Tournous interferometers, double-stack mirrors) with adjustable group-delay dispersion (GDD) through angle tuning have been devised and used for intracavity dispersion control in femtosecond dye lasers (see, J. Heppner and J. Kuhl, Applied. Physics Letters, Vol. 47, p. 453, 1985, and M. Yamashita, K. Torizuka, and T. Sato, IEEE Journal of Quantum Electronics Vol. 23, p. 2005, 1987). However, the GDD introduced by these mirror coatings is always accompanied by comparatively high cubic- and higher-order dispersion contributions, i.e. a constant GDD can be obtained only over a very limited wavelength ranges (<10 THz). The difficulty in realizing broadband GDD control relates to the physical origin of dispersion in these devices; different frequency components are trapped for different periods of time in Fabry-Perot like resonant structures. As a consequence, they have not been applied in practical, off-laboratory laser systems.

SUMMARY OF THE INVENTION

It is an object of this invention to solve the inherent problem of the variation of the intracavity GDD with wavelength in prism-pair-dispersion controlled femtosecond-pulse solid-state lasers and to simplify the laser cavity setup. To this end we have developed the presently preferred dispersive dielectric mirror exhibiting a monotonic, more particularly substantially linear group delay versus frequency function over a wide frequency range, more than a continuous half part of the high reflectivity band of the mirror, which group delay is introduced on electromagnetic wavepackets, more particularly as mentioned above, on light pulses, when the electromagnetic wave is reflected on the mirror. High reflectivity band of the mirror has been defined as a continuous frequency range over which the reflectivity is higher than 99%.

Here we use the expression "substantially linear" in the sense of that the GDD, which is the first derivative of the group delay with respect to the frequency, varies less than ±20% around its average value. Furthermore our invention is suitable for compensation of additive higher order, such as second and third order variation of the group delay as well.

In general, designing of the dispersive dielectric mirror consists of the following two steps: first, constructing an initial design for computer refinement, secondly, the optimization process carried out by a computer. The initial design could be constructed directly by the use of Fourier-transform properties of optical thin film structures (see, R. Szipöcs, A. Kohazi-Kis, SPIE Proceedings on Optical Interference Coatings, Vol. 2253, paper 17), or intuitively, e.g. by choosing the multilayer period to follow an arithmetic or algebraic progression. For the computer optimization procedure, different numeric methods can be used (for review see, e.g., J. A. Dobrowolski et. al., Applied Optics Vol. 29, p. 2876 1988), with one important common feature: the merit function should always be contributed from two functions describing the quadratic (or absolute value) deviation from the desired amplitude vs. wavelength, and dispersive (e.g., group delay, group-delay dispersion, etc., vs. wavelength) functions, respectively.

The dispersive dielectric mirror is well suited for dispersion control in electromagnetic impulse technique from microwave frequencies to X-rays, more particularly, in ultrashort-pulse laser technique and its applications. One of the concrete applications of the dispersive dielectric mirrors is to use them for intracavity broadband dispersion control in femtosecond pulse solid-state-laser oscillators instead of using the traditional, robust Brewster-angled prism pair arrangement.

DETAILED DESCRIPTION OF THE PREFERRED EMBODIMENT

Here we present one of the concrete realization of the dispersive dielectric mirror, which has been designed for a femtosecond-pulse Ti:sapphire laser (see R. Szipöcs, K. Ferencz, Ch. Spielmann and F. Krausz, Optics Letters, Vol. 19, p. 201, 1994 and A. Stingl, Ch. Spielmann, F. Krausz and R. Szipöcs, Optics Letters, Vol. 19, p. 204, 1994). The dispersive dielectric mirror presented consists of $TiO_2$ and $SiO_2$ layers, which have been deposited by vacuum evaporation technique in this specific case (for details, see K. Ferencz, R. Szipöcs, Optical Engineering, Vol. 32, p. 2525, 1993), but any other well-known depositing technique can be alternatively used.

Figure 1:
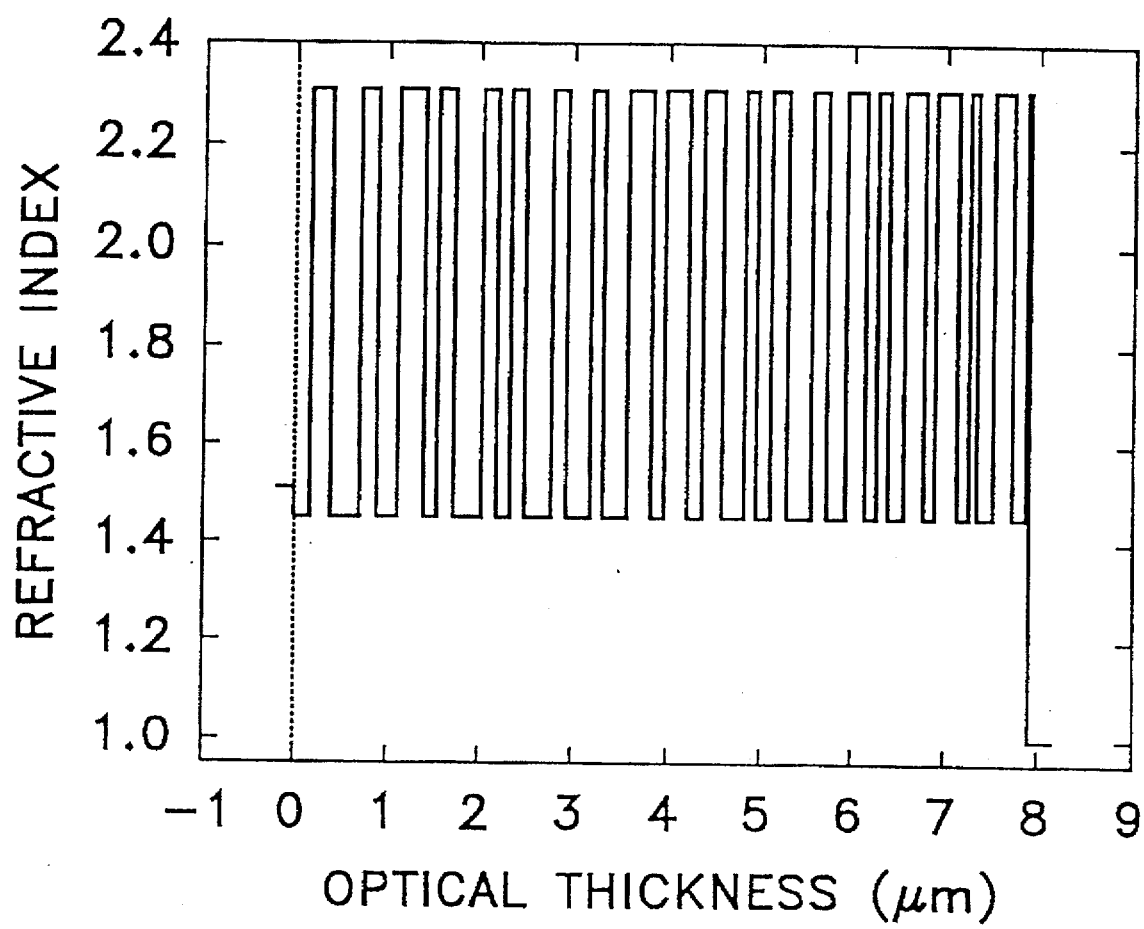
FIG. 1 is an illustration of a refractive-index profile of a dispersive dielectric mirror designed specifically for broadband dispersion control in a femtosecond pulse Ti:sapphire laser.

FIG. 1 is an illustration of a refractive-index profile of the above mentioned dispersive dielectric mirror designed for broadband dispersion control of a femtosecond pulse Ti:sapphire laser. One of the most characteristic and striking features of the structure is that the multilayer period increases toward the substrate surface (optical distance=0) in average, that is why we often refer them as "chirped" multilayer dielectric mirrors.

In the course of constructing this multilayer structure we started the design procedure with gaining initial thickness values prompted by the Fourier-transform properties of dielectric mirrors and known dielectric mirror structures. The two type of the layers are to be made of different dielectric materials. In this case one material was $SiO_2$ with refractive index $n_L=1.45$ and $TiO_2$ with refractive index $n_H=2.31$. Next to this step a numeric optimizing of the initial layer thicknesses was carried out, as mentioned earlier. We required a nearly constant negative GDD of $-45\,fs^2$ over the wavelength range of 720–890 nm (corresponding to 80 THz) in this specific case. This value is one order of magnitude better than the state of art mirror solutions known from the recent publications, due to the distinctly different physical approach used.

The columns of the following table shows the resulted coefficient values, where a quarterwave layer of $SiO_2$ is designated by L and a quarterwave layer of $TiO_2$ is designated by H.

| Substrate | | |
|---|---|---|
| 0.8746 L | 1.3090 L | 1.0344 L |
| 1.1360 H | 0.6899 H | 1.0867 H |
| 1.5804 L | 1.3003 L | 0.6247 L |
| 0.9773 H | 1.2912 H | 0.6587 H |
| 1.1753 L | 0.6874 L | 0.8736 L |
| 1.4465 H | 1.2995 H | 1.1185 H |
| 0.7483 L | 0.8073 L | 0.6232 L |
| 0.9600 H | 1.0661 H | 1.2079 H |
| 1.5724 L | 1.2475 L | 0.6283 L |
| 0.8492 H | 0.6651 H | 0.4309 H |
| 0.7299 L | 0.8142 L | 0.9267 L |
| 0.8378 H | 0.9649 H | 1.0710 H |
| 1.4494 L | 1.3478 L | 0.7758 L |
| 0.8468 H | 0.8796 H | 0.1600 H |
| | | Air |

The reference wavelength was chosen to be 790 nm in the case of this Ti:sapphire laser mirror.

Figure 2:
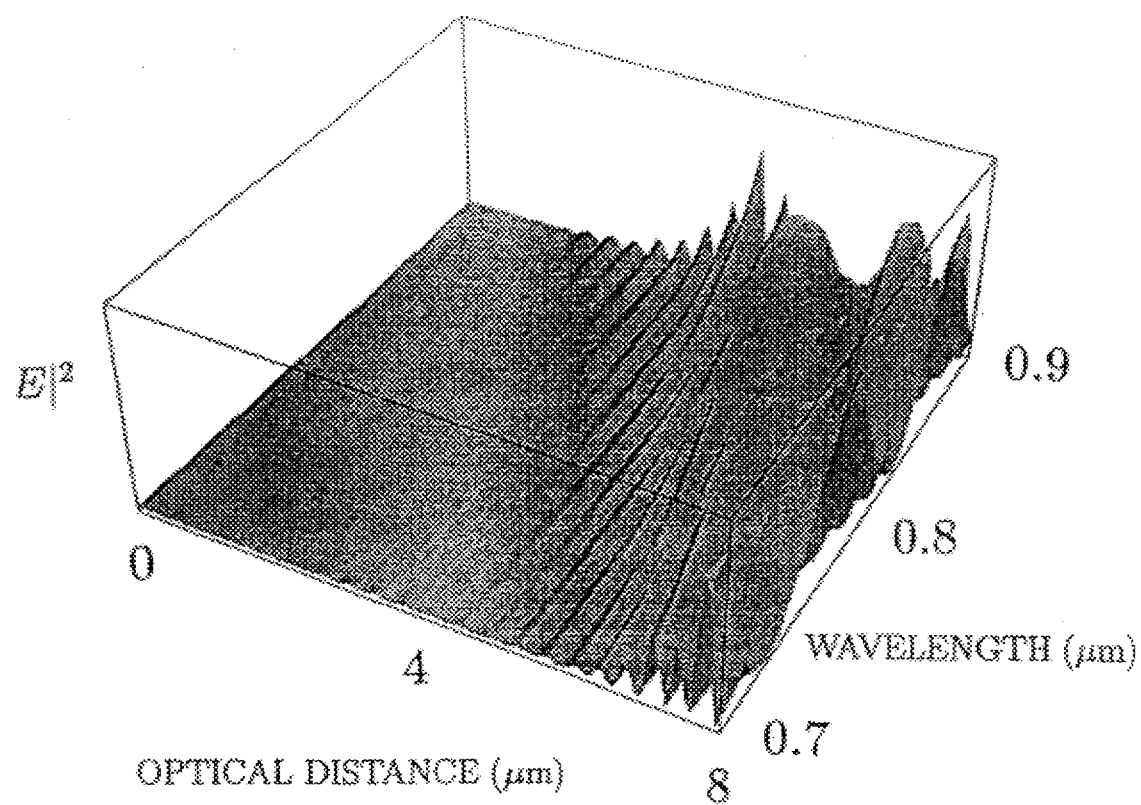
FIG. 2 is two-dimensional graphic representation of a computed electric-field $E^2$ distribution as a function of wavelength in the dispersive dielectric mirror shown in FIG. 1.

In FIG. 2, the computed electric-field $E^2$ distribution is illustrated as a function of wavelength in the chirped dielectric structure shown in FIG. 1. One can observe, that the penetration depth increases approximately linearly with the wavelength, resulting in a nearly constant negative group-delay dispersion over a frequency range as broad as 80 THz. We note that the term of penetration depth has been defined in the literature, for instance by article of D. I. Babic, S. W. Corzine, IEEE Journal of Quantum Electronics, Vol. 28, p. 514 (1992).

FIG. 2 furthermore gives clear evidence of the high reflectivity of the mirror between 700 and 900 nm as indicated by the disappearance of the optical field at the substrate-coating interface (optical distance=0).

As for the dielectric mirrors according to the invention the nearly constant GDD arises from the wavelength dependence of the penetration depth of the incident optical field in multilayer coatings. This effect does not rely on the presence of resonant structures and offers the possibility of realizing a GDD that is a slowly varying function of wavelength over a broad bandwidth.

A constant GDD requires a group delay that varies approximately linearly with the wavelength. A wavepacket of a given center wavelength is most efficiently reflected by a corresponding quarter-wave stack. Therefore a monotonic variation of the multilayer period throughout the deposition process (chirped coating) should result in a penetration depth, and thus group delay, that varies monotonically with the wavelength. In its simple physical aspect this principle is equivalent to the statement that if a mirror is moved backward, a light pulse reflected on the mirror exhibits an increased propagation delay. However, a previous study of chirped multilayer coatings with layer thicknesses following an arithmetic or geometric progression revealed that the monotonic variation of the group delay with wavelength is strongly perturbed by some Fabry-Perot-like resonances in these simple structures. The most important finding towards the practical realization of the invented dispersive dielectric mirror is that the undesirable resonant features can be almost completely eliminated by slight adjustments of the layer thicknesses, according to the second step of the previously described construction procedure.

Figure 3:
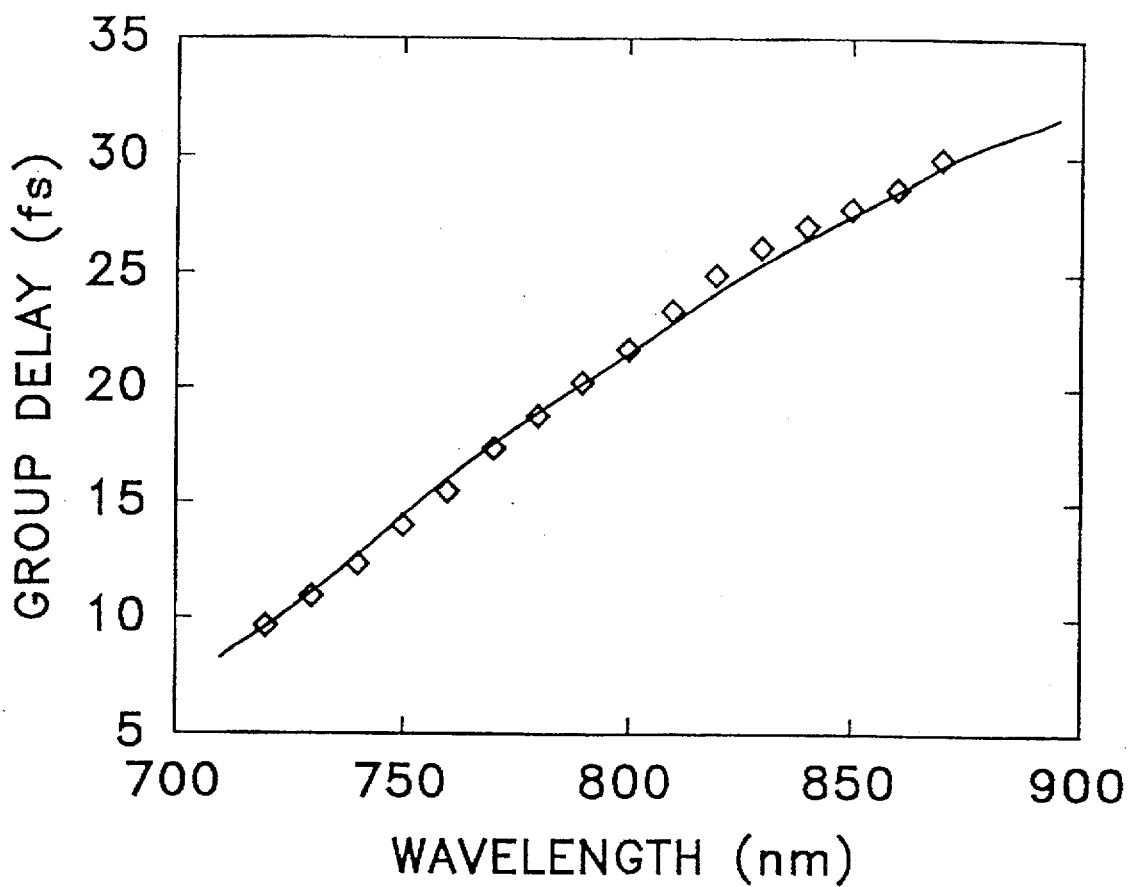
FIG. 3 shows the computed group delay as a function of wavelength (continuous line) together with the experimental data (squares) for the dispersive dielectric mirror of FIG. 1.

The computed group delay is shown in FIG. 3 as a function of wavelength (continuous curve) together with the experimental data (squares) for the dispersive mirror design of FIG. 1.

In order to prove the usefulness of our present invention, the dispersive dielectric mirrors shown in FIG. 1 have been built into a laser cavity containing a 2-mm-thick Ti:sapphire crystal as laseractive material. Using 7 reflections on the dispersive dielectric mirrors during one roundtrip in the cavity, the laser generated optical pulses as short as 11 fs without the use of any other broadband dispersive element having negative GDD (for details, see A. Stingl, Ch. Spielmann, F. Krausz and R. Szipöcs, Optics Letters Vol. 19, p. 204, 1994). Our experiments proved the working of our present invention.

Dispersive dielectric mirrors according to the invention are well suited for building femtosecond pulse solid-state lasers without the use of prism-pairs. The mirror-dispersion-controlled laser is more compact, reliable than its prism-pair-controlled predecessor.

Dispersive dielectric mirrors according to the invention can also be well used in femtosecond pulse laser amplifier systems in which stretching and recompression of the optical pulse is required. This method is often referred to as chirped pulse amplification (CPA). Stretching and compressing need practically the same GDD functions of opposite sign.

Dispersive dielectric mirrors according to the invention can be applied in other regions of the electromagnetic spectrum, practically from microwave frequencies to X-rays.

It will be appreciated by those skilled in the art that many various modifications and alternatives to those details of the invention could be developed. The disclosed example is meant to be illustrative only and not limiting the scope of the invention.

We claim:

1. A dielectric mirror for incident electromagnetic waves included in a high reflectivity frequency range between low microwave frequencies and high X-ray frequencies, comprising:

a plurality of layers of different thicknesses, said layers being transparent for said incident electromagnetic waves within said high reflectivity frequency range, and having refractive indices which vary between the plurality of layers, said dielectric mirror having a reflectivity of at least 99% for said incident electromagnetic waves within said high reflectivity range and a reflectivity of less than 99% in each of the two contiguous frequency ranges adjacent said high reflectivity frequency range, said dielectric mirror introducing a group delay for electromagnetic wavepackets within said high reflectivity frequency range which are reflected on said mirror, said dielectric mirror having a dispersive, group delay versus frequency characteristic for said group delay which is substantially proportional to the frequency dependent penetration depth of said wavepackets into said plurality of layers, said dispersive, group delay versus frequency characteristic of the mirror being monotonic and substantially linear within said high reflectivity frequency range of the mirror over a range of at least a continuous half-part of said high reflectivity frequency range.

2. The dielectric mirror according to claim 1, wherein said high reflectivity frequency range is in an optical range.

3. Dielectric mirror according to claim 2 having monotonically decreasing group delay versus frequency function.

4. A method of using the dielectric mirrors according to claim 2, comprising providing an ultrashort pulse laser and providing an amplifier therefor including said dielectric mirror for stretching and recompression of an optical pulse.

5. The dielectric mirror according to claim 1, wherein said dielectric mirror further has a small, higher-order component superimposed on said dispersive, group delay versus frequency characteristic.

6. Dielectric mirror according to claim 5 having monotonically decreasing group delay versus frequency function.

7. The dielectric mirror according to claim 1, wherein said dispersive group delay versus frequency characteristic decreases monotonically.

8. A method of using the dielectric mirror according to claim 7, comprising providing a femtosecond-pulsed solid state laser and wherein said dispersive group delay versus frequency characteristic is negative for solitary pulse formation with said dielectric mirror.

9. A method for constructing the dielectric mirror according to claim 1, comprising the steps of:

specifying an initial design of different layer thicknesses and refractive indices by one of a formal method of Fourier transform characterization of thin-film performance and an intuitive method of predicting thin-film performance;

numerically optimizing the design with respect to at least one of layer thickness and refractive index by a merit function describing one of quadratic deviation from a desired amplitude function and absolute value deviation from a desired dispersive function; and depositing said layers of said optimized design.

10. A method for constructing a dispersive dielectric mirror according to claim 9, and further comprising a final evaluating step of:

depositing one of said layers onto a solid surface of a substrate.

11. Dielectric mirror according to claim 1 having monotonically decreasing group delay versus frequency function.

* * * * *